United States Patent
Whittaker et al.

[11] 3,826,465
[45] July 30, 1974

[54] VALVE ASSEMBLY
[75] Inventors: Stanley James Whittaker; Cyril J. Astill; Peter Janzen, all of Deep River, Ontario, Canada
[73] Assignee: Atomic Energy of Canada Limited, Ottawa, Canada
[22] Filed: Nov. 24, 1972
[21] Appl. No.: 309,455

[52] U.S. Cl............................................ 251/335 B
[51] Int. Cl......................................... F16k 31/365
[58] Field of Search .................. 251/335 B, 335 R

[56] References Cited
UNITED STATES PATENTS

| | | | |
|---|---|---|---|
| 2,693,822 | 11/1954 | Gerom et al. | 251/335 B |
| 2,912,867 | 11/1959 | Gallant | 251/335 R |
| 3,097,662 | 7/1963 | Peters | 251/335 R |
| 3,315,700 | 4/1967 | Greenwood | 251/335 R |
| 3,573,863 | 4/1971 | Doors et al. | 251/335 B |

FOREIGN PATENTS OR APPLICATIONS

| | | | |
|---|---|---|---|
| 869,101 | 5/1961 | Great Britain | 251/335 B |
| 1,023,942 | 2/1958 | Germany | 251/335 B |
| 1,361,534 | 4/1964 | France | 251/335.2 |

Primary Examiner—Henry T. Klinksiek
Attorney, Agent, or Firm—Francis W. Lemon

[57] ABSTRACT

A valve assembly having an annular cavity around the valve stem in the casing, with two, coextensive pairs of bellows around the valve stem, each pair being arranged end-to-end and sealed to form a cavity between them. The inner pair of bellows is joined at their join to the valve stem, whilst the outer pair of bellows are joined to the casing. When the valve is opened to pass transport fluid, buffer fluids sealed between the bellows and in an outer portion of the annular cavity beyond the bellows are brought to the pressure of the transport fluid by flexing of the bellows. Thus should a bellows fail the transport fluid will only seep through that bellows into the buffer fluid.

4 Claims, 1 Drawing Figure

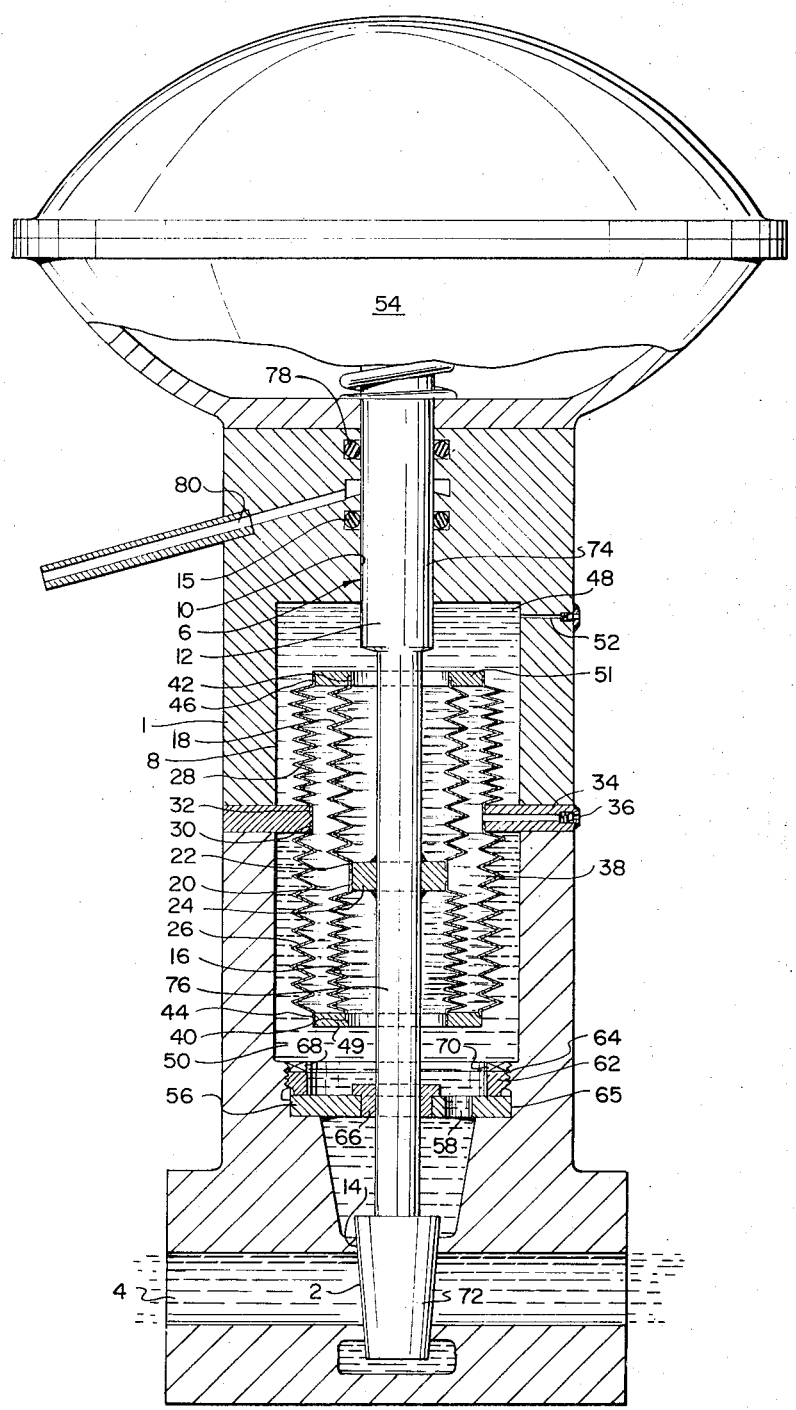

VALVE ASSEMBLY

This invention relates to a valve assembly.

It has already been proposed to seal a valve stem in a casing by means of bellows. However, these proposals suffer from the disadvantage that differential fluid pressures exist on each side of the bellows so that should the bellows become punctured there is an immediate and substantial escape of fluid through the bellows to equalize the pressure differential.

When, for example, a valve assembly using a bellows seal is required for radioactive, high temperature and high pressure application it is desirable that an immediate and substantial escape of fluid through the bellows be avoided when the bellows fails.

It is one object of the present invention to provide a valve assembly using a bellows seal wherein an immediate and substantial escape of fluid through the bellows is avoided when the bellows fails.

Furthermore, known types of valve assemblies using a bellows seal have an operating life that is too limited for economical application involving, for example, radioactive high temperatures and high pressures.

It is a further object of the present invention to provide a valve assembly using a bellows seal and which has an operating life that is economical for applications involving, for example, radioactivity, high temperatures and high pressures.

According to the present invention, there is provided a valve assembly, comprising a casing having a valve stem seating forming a sealing surface, for sealing a transport fluid passage through the casing, and a valve stem bore extending inwardly through the casing, and terminating at the valve stem seating, with an inner portion of the valve stem being of relatively larger cross-section that the remainder to form an annular cavity extending inwardly from a necked portion, a valve stem slidably located in the necked portion and extending along the valve stem bore to seal a sealing surface on the valve stem against the valve stem seating, a seal sealing the valve stem in the necked portion, an inner pair of bellows in the annular cavity and around the valve stem and in series along the valve stem, the inner pair of bellows being sealed at their adjacent ends to the valve stem, an outer pair of bellows in the annular cavity and around the inner pair of bellows and in series along the valve stem, the outer pair of bellows being sealed at their adjacent ends to the casing with a buffer fluid charging port extending through the casing to a buffer fluid chamber between the inner and outer pairs of bellows, the inner and outer pairs of bellows being co-extensive and having their remote ends sealed to one another with the sealed ends being freely movable to flex the bellows and to seal the buffer fluid chamber therebetween as a separating chamber separating a secondary captive buffer fluid chamber formed by a portion of the annular cavity adjacent the necked portion from a transport fluid chamber formed by a portion of the annular cavity adjacent the valve stem seating, a secondary captive buffer fluid charging port extending through the casing to the secondary captive buffer fluid chamber, and a valve actuator on the casing for moving the valve stem longitudinally.

In the accompanying drawing which illustrates, by way of example, an embodiment of the present invention, there is shown a partly sectioned side view of a valve assembly.

Referring now to the drawing the valve assembly includes a casing 1 having a valve stem seating 2 forming a sealing surface, for sealing a transport fluid passage 4 through the casing 1, and a valve stem bore 6 extending inwardly through the casing 1, and terminating at the valve stem seating 2, with an inner portion of the valve stem bore 6 of relatively larger cross-section than the remainder to form an annular cavity 8 extending inwardly from a necked portion 10. A valve stem 12 is slidably located in the necked portion 10 and extends along the valve stem bore 6 to seal a sealing surface 14 on the valve stem 12 against the valve stem seating 2. An O-ring seal 15 seals the valve stem 12 in the necked portion 10. An inner pair of bellows 16, 18 are provided in the annular cavity 8 and around the valve stem 12 and in series along the valve stem 12. The inner pair of bellows 16, 18 are sealed at their adjacent ends 20 and 22 respectively to the valve stem 12. In this embodiment the ends 20 and 22 are sealed to the valve stem 12 via a collar 24. An outer pair of bellows 26, 28 are also provided in the annular cavity 8 and are around the inner pair of bellows 16, 18 and in series along the valve stem 12. The outer pair of bellows 26, 28 are sealed at their adjacent ends 30 and 32 respectively to the casing 1. In this embodiment the ends 30 and 32 are sealed to the casing 1 via a collar 34 of the casing 1 having a buffer fluid charging port 36 extending through the casing 1 to a buffer fluid chamber 38 between the inner pair of bellows 16, 18 and the outer pair of bellows 26, 28. The inner pair of bellows 16, 18 and the outer pair of bellows 26, 28 are co-extensive and have their remote ends 40 to 46 respectively sealed to one another with the sealed ends 40 t0 46 being freely movable to flex the bellows 16, 18, 26 and 28 and to seal the buffer fluid chamber 38 as a separating chamber separating a secondary captive buffer fluid chamber 48 formed by a portion of the annular cavity 8 adjacent the necked portion 10 from a transport fluid chamber 50 formed by a portion of the annular cavity 8 adjacent the valve stem seating 2. In this embodiment the sealed ends 40 and 44 are sealed to one another via an annular plate 49, and the sealed ends 42 and 46 are sealed to one another via an annular plate 51. A secondary captive buffer fluid charging port 52 is provided extending through the casing 1, to the secondary captive buffer fluid chamber 48, and a valve actuator 54, which is either a manual or a fluid pressure actuated type is provided on the casing 1 for moving the valve stem 12 axially.

A baffle stem plate 56 has a transport fluid port 58 therethrough and is secured in the casing 1 adjacent the valve stem seating 2 and in the transport fluid chamber 50, and the valve stem 12 is slidably located in the baffle stem bearing 66. The baffle stem plate 56 contains the transport fluid port 58, an externally threaded clamping ring 62 screw threaded into a threaded recess 64 in the transport fluid chamber 50 to removably secure the baffle stem plate 56 in a recess 65 in the casing 1, and a baffle stem bearing 66, secured in baffle stem plate 56, with the valve stem 12 slidably located in it. The clamping ring 62 has slots 68 and 70 for engagement with a removing tool (not shown).

An inner end portion of the valve stem 12 which has the sealing surface 14 is an enlarged plug 72 tapering inwardly towards the valve stem seating 2, the valve stem seatings 2 are flat tapering surfaces for engagement with the wedge shaped plug and the outer end 74 of the valve stem 12 which is slidably located in the necked portion 10 is of relatively larger diameter, than the remainder 76 of the valve stem 12 extending to the plug portion 72, to substantially compensate for changes in the volume in the annular cavity 8 by withdrawal therefrom of the outer end 74, when the valve stem 12 is actuated by the valve actuator 54, to draw the plug 72 into the annular cavity 8.

The O-ring seal 15 sealing the valve stem 12 in the necked portion 10 of the casing 1 is a first seal, a second O-ring seal 78 seals the valve stem 12 in the necked portion 10 at a position spaced along the valve stem 12 from the first O-ring seal 15, and a leak-off passage 80 is provided extending through the casing 1 to a portion of the valve stem 12 between the first O-ring seal 15 and the second )-ring seal 78. O-ring In operation the buffer fluid chamber 28 is filled with a buffer fluid having a low thermal expansion, low vapour pressure and the secondary captive buffer fluid chamber is filled with a similar buffer fluid. The valve assembly is in the closed position with the valve stem 12 having the plug 72 in engagement with the valve stem seating 2. Thus transport fluid is prevented from flowing along the transport fluid passage 4. When the valve stem 12 is retracted by means of the valve actuator 54 the plug 72 is removed from engagement with the valve stem seating 2 and transport fluid is allowed to flow along the passage 4 and into the transport fluid chamber 50 through the transport fluid port 58.

As the valve stem 12 is retracted the inner bellows 16 is flexed by the collar 24 to open a little whilst the inner bellows 18 is flexed to close a little. The bellows 16 and 18 are chosen so that any loss in the volume of the buffer fluid chamber 38 by closing the inner bellows 16 is preferably compensated for by an increase in volume by opening the inner bellows 18 and vice versa.

The transport fluid flowing into the transport fluid chamber 50 will pressurize the inner bellows 16 and outer bellows 26 and probably flex them a little until the pressure of the buffer fluid in buffer fluid chamber 38 is equalised with the pressure of the transport fluid. The pressure of the buffer fluid in the secondary captive buffer fluid chamber 48 is in turn equalised with the pressure of the buffer fluid in the buffer fluid chamber 38, this probably flexes the inner bellows 18 and the outer 28 a little. Thus there will be substantially no pressure differential between the transport fluid, the buffer fluid in the buffer fluid chamber 38, and the buffer fluid in the secondary captive buffer fluid chamber 48, and so should one of the bellows 16, 18, 26 or 28 fail the leakage of transport fluid will be slow and in the form of seepage.

The secondary O-ring seal 78 ensures that all fluid escaping from the secondary captive buffer fluid chamber 48 is channelled through the leak-off passage 80 to a container (not shown). When a prescribed amount of leakage fluid has accumulated in the container, a sensor may be actuated to warn of the necessity to replenish the secondary captive buffer fluid chamber 48 with buffer fluid via charging port 52.

Valve assemblies according to the present invention have the following advantages:

1. Any thermal expansion of either of the buffer fluids is accommodated without exceeding the permissible deformation of any of the bellows 16, 18, 26 or 28, or limiting the freedom of their movement.

2. As already stated the outer end of stem 74 substantially compensates for changes in the volume in the annular cavity 8 by withdrawal therefrom of the outer end 74, when the valve stem 12 is actuated by the valve actuator 54, to draw the plug 72 into the annular cavity 50. By substantially compensating for changes in the volume in the annular cavity 8, and thus maintaining a substantially constant volume therein, linear displacement of the annular plate 51 to the tolerable maximum open flexing of the bellows is achieved.

3. The configuration of the assembly of the bellows 16, 18, 26 and 28 results in an amplification of the displacement of the valve stem 12, i.e. for every inch of travel of the valve stem 12, the annular plates 49 and 51 are displaced only about one half of an inch. The maximum travel that is tolerable of the valve stem 12 is therefore twice the tolerably flexing of the bellows 16, 18, 26 and 28.

We claim:

1. A valve assembly, comprising a casing having a valve stem seating forming a sealing surface, for sealing a transport fluid passage through the casing, and a valve stem bore extending inwardly through the casing, and terminating at the valve stem seating, with an inner portion of the valve stem bore being of relatively larger cross-section than the remainder to form an annular cavity extending inwardly from a necked portion, a valve stem slidably located in the necked portion and extending along the valve stem bore to seal a sealing surface on the valve stem against the valve stem seating, a seal sealing the valve stem in the necked portion, an inner pair of bellows in the annular cavity and around the valve stem and in series along the valve stem, the inner pair of bellows being sealed at their adjacent ends to the valve stem and secured thereto for movement therewith, an outer pair of bellows in the annular cavity and around the inner pair of bellows and in series along the valve stem, the outer pair of bellows being sealed and secured at their adjacent ends to the casing against relative movement therebetween with a buffer fluid charging port extending through the casing to a buffer fluid chamber between the inner and outer pairs of bellows, the inner and outer pairs of bellows being co-extensive and having their remote ends sealed to one another with the sealed ends being freely movable to flex the bellows and to seal the buffer fluid chamber therebetween as a separating chamber separating a secondary captive buffer fluid chamber formed by a portion of the annular cavity adjacent the necked portion from a transport fluid chamber formed by a portion of the annular cavity adjacent the valve stem seating, a secondary captive buffer fluid charging port extending through the casing to the secondary captive buffer fluid chamber, and a valve actuator on the casing for moving the valve stem longitudinally.

2. A valve assembly according to claim 1, wherein a baffle stem bearing having a transport fluid port therethrough is secured in the casing adjacent the valve stem seating and in the transport fluid chamber, and the valve stem is slidably located in the baffle stem bearing.

3. A valve assembly according to claim 2, wherein the baffle stem bearing comprises a baffle stem plate containing the transport fluid port, an externally threaded clamping ring screw threaded into a threaded recess in the transport fluid chamber to removably secure the baffle stem plate in a recess in the casing, and a bearing secured in the baffle stem plate, with the valve stem slidably located therein.

4. A valve assembly according to claim 1, wherein an inner end portion of the valve stem which has the sealing surface is an enlarged plug tapering inwardly towards the valve stem stem seating, the valve stem seatings are flat tapering surfaces for engagement with the wedge shaped plug and the outer end of the valve stem which is slidably located in the necked portion is of relatively larger diameter, than the remainder of the valve stem extending to the plug portion, to substantially compensate for changes in volume in the annular cavity when the valve stem is actuated by the valve actuator to draw the plug cock into the annular cavity.

* * * * *